United States Patent
Spillman et al.

(10) Patent No.: US 6,623,884 B1
(45) Date of Patent: Sep. 23, 2003

(54) ELECTROCHEMICAL LITHIUM ION SECONDARY CELL HAVING MULTIPLATE AND JELLYROLL ELECTRODES WITH DIFFERING DISCHARGE RATE REGIONS

(75) Inventors: David M. Spillman, Tonawanda, NY (US); Esther S. Takeuchi, East Amherst, NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 285 days.

(21) Appl. No.: 09/633,408

(22) Filed: Aug. 7, 2000

(51) Int. Cl.⁷ .................................................. H01M 4/00
(52) U.S. Cl. ..................... 429/94; 429/231.4; 429/231.8
(58) Field of Search ................................ 429/94, 231.4, 429/231.8

(56) References Cited

U.S. PATENT DOCUMENTS

| | | |
|---|---|---|
| 457,430 A | 8/1891 | Poudroux |
| 1,334,849 A | 3/1920 | Fraley |
| 2,118,712 A | 5/1938 | Oppenheim |
| 4,447,504 A | 5/1984 | Goebel ............................. 429/9 |
| 5,008,165 A | 4/1991 | Schmöde ......................... 429/94 |
| 5,439,756 A | 8/1995 | Anani et al. |
| 5,569,553 A | 10/1996 | Smesko et al. |
| 5,587,250 A | 12/1996 | Thomas et al. ................. 429/3 |
| 5,667,910 A | 9/1997 | Takeuchi et al. ............ 429/128 |
| 5,670,266 A | 9/1997 | Thomas et al. ................. 429/3 |
| 5,935,724 A | 8/1999 | Spillman et al. |
| 5,935,728 A | * 8/1999 | Spillman ..................... 429/94 |
| 6,117,585 A | 9/2000 | Anani et al. |

FOREIGN PATENT DOCUMENTS

| | | | |
|---|---|---|---|
| EP | 0 872 908 A1 | * 10/1998 | .......... H01M/10/04 |
| EP | 0 989 624 A1 | 3/2000 | |

OTHER PUBLICATIONS

Pistoia, G. ed. Lithium Batteries, New Materials, Developments, and Perspectives. New York: Elsevier Science B.V., 1994, p. 43.*

* cited by examiner

Primary Examiner—Mark Ruthkosky
(74) Attorney, Agent, or Firm—Michael F. Scalise

(57) ABSTRACT

A secondary electrochemical cell comprising a medium rate electrode region in a side-by-side electrode plate configuration intended to be discharged under a substantially constant drain and a high rate electrode region disposed in a jellyroll wound configuration intended to be pulse discharged, is described. Both electrode regions share a common anode and are activated with the same electrolyte.

46 Claims, 1 Drawing Sheet

ELECTROCHEMICAL LITHIUM ION SECONDARY CELL HAVING MULTIPLATE AND JELLYROLL ELECTRODES WITH DIFFERING DISCHARGE RATE REGIONS

BACKGROUND OF THE INVENTION

1. Field of the Invention

The present invention generally relates to the conversion of chemical energy to electrical energy. More particularly, the present invention relates to a secondary electrochemical cell dischargeable under both a constant discharge rate and a pulse discharge rate. Cardiac defibrillators present both electrical power requirements.

The constant discharge rate portion of the secondary cell of the present invention, referred to hereinafter as the medium rate region, preferably includes a high mass, low surface area lithium-retention cathode structure associated with a carbonaceous anode electrode in a side-by-side prismatic configuration. The pulse discharge rate portion of the secondary cell of the present invention, referred to hereinafter as the high rate region, preferably includes a high surface area lithium-retention cathode associated with a carbonaceous anode in a jellyroll wound configuration. Preferably the same anode structure is electrically associated with both the medium rate lithium-retention cathode region and the high rate lithium-retention cathode region housed within the same hermetically sealed casing. This structure defines what is meant by a medium rate region and a high rate region contained within the same secondary electrochemical cell.

2. Prior Art

Traditionally, cardiac defibrillator cells have been built using a multiplate electrode design. The cell designer must decide between providing additional electrochemically active components for increased mass and energy density or providing increased surface area for greater power density. Because of the wide disparity in the energy/power requirements placed upon a cardiac defibrillator cell or battery, that being intermittent low rate and high rate operation, a compromise is often decided upon. However, any design attempt to balance the energy/power requirements placed upon the cell or battery by the defibrillator device must not consequently produce unwanted self-discharge reactions. This compromise can provide for inefficiency and can decrease the overall gravimetric and volumetric energy density of the cell.

It is generally accepted that when low electrical currents are desired, the electrodes within a cell, whether of a primary or a secondary configuration, should have as much mass and as little surface area as possible. At the expense of power density, this provides for increased energy density while the low electrode surface area minimizes undesirable self-discharge reactions. Conversely, when larger electrical discharge currents are required, electrode surface area and power density are maximized at the expense of energy density and self-discharge rate.

The secondary cell of the present invention having an electrode assembly with differing discharge rate portions fulfills this need. The present secondary cell comprises regions containing a low interelectrode surface area in a side-by-side, prismatic configuration, preferred for routine monitoring by a device, for example a cardiac defibrillator, and regions containing a high interelectrode surface area in a jellyroll wound configuration for use when high rate electrical pulse charging of capacitors is required with minimal polarization. It is believed that the present secondary electrochemical cell having electrodes with differing discharge rate regions represents a pioneering advancement wherein a medium discharge rate region and a high discharge rate region are provided within the same case for the purpose of having the cell supply at least two different electrical energy requirements.

SUMMARY OF THE INVENTION

The present invention provides an improved multiplate and jellyroll electrode design for an electrochemical lithium ion secondary cell dischargeable to provide background current intermittently interrupted or supplemented by current pulse discharge. The disclosed secondary cell is of a case-negative design in which the carbonaceous anode assembly is in electrical contact with the case. Two positive terminal pins are respectively connected to two independent lithium-retention cathode regions. One lithium-retention cathode region has a relatively low surface area and high density for providing low electrical current on the order of microamperes to milliamperes and the other lithium-retention cathode region has a relatively high surface area for providing high electrical current on the order of several hundred milliamperes to amperes.

The medium rate, constant discharge region of the present secondary cell comprises a lithium-retention cathode structure of one or more cathode plates flanked on either side by a carbonaceous anode. The lithium-retention cathode material, which preferably comprises an air stable lithiated compound, suitable conductive additives and a binder, may be in a dry powder form and is pressed onto a conductive metal screen or foil. The carbonaceous anode preferably consists of carbon fibers, mesocarbon microbeads, graphitic carbon, non-graphitic carbon, petroleum coke, and other types of carbon that are also pressed onto a conductive metal screen or foil. A metallic lead connects the medium rate cathode region to a feedthrough terminal pin in the battery header which is insulated from the battery case by a glass-to-metal seal. The anode is either connected to the case resulting in a case-negative configuration or to another feedthrough pin also located in the header of the battery. A separator prevents short circuiting between the couple.

The high rate, pulse discharge region of the present secondary cell comprises a lithium-retention cathode structure of one or more cathode sheets associated in a jellyroll wound configuration with the same anode that is coupled to the medium rate region. The interelectrode surface area of the high rate region is greater than that of the medium rate region to deliver high current pulses during device activation. Preferably the medium rate region contributes greater than 10% of the total energy density provided by the cell while having less than 50% of the total cathode surface area. Still more preferably, the medium rate region contributes greater than 10% of the total energy density provided by the cell while having less than 30% of the total cathode surface area.

Thus, the present invention offers the advantage of having both a medium rate, constant discharge or constant drain region and a high rate, pulse discharge region provided within the same secondary electrochemical cell. The electrochemical couple used for both the medium rate region and the high rate region is, for example, a carbon/lithiated oxide couple such as a carbon/$LiCoO_2$ couple. However, both discharge region couples need not necessarily be identical. Secondary electrochemical cells according to the present invention having medium rate and high rate discharge regions can be constructed and designed to meet the drain rate and current discharge requirements of a particular application.

These and other aspects of the present invention will become more apparent to those skilled in the art by reference to the following description and the appended drawings.

DETAILED DESCRIPTION OF THE PREFERRED EMBODIMENTS

Figure 1:
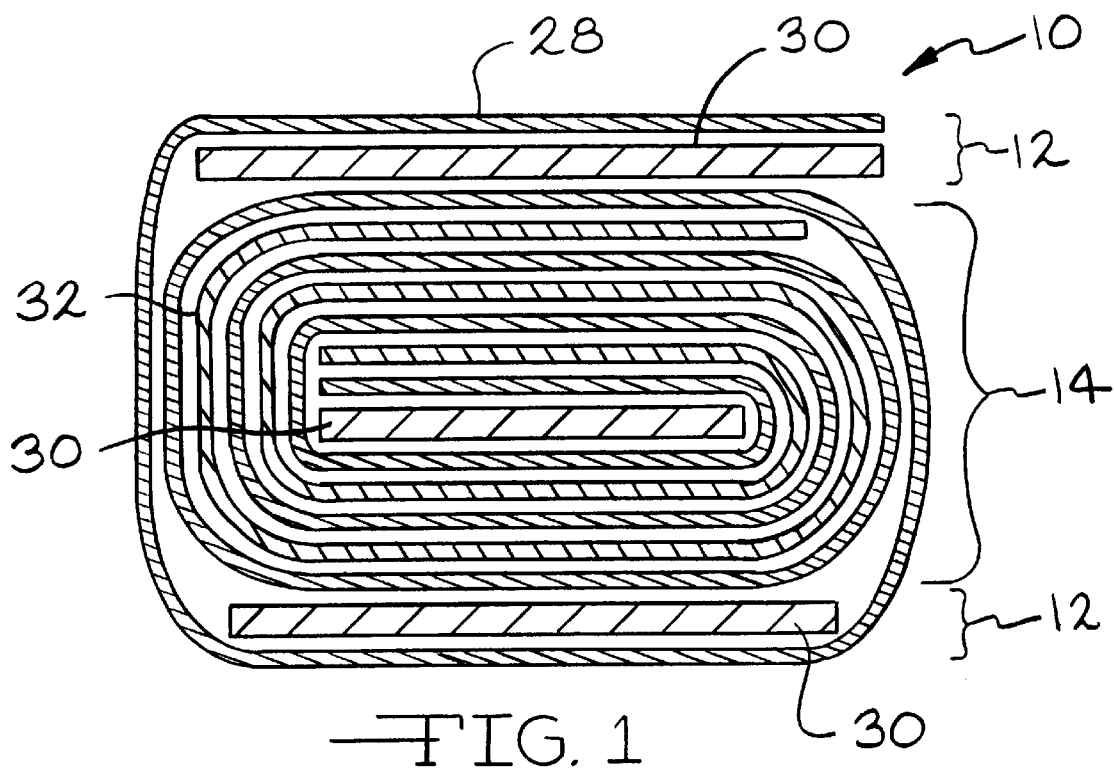
FIG. 1 is a diagrammatic view of a secondary electrochemical cell 10 with multiplate electrodes according to the present invention.
Figure 2:
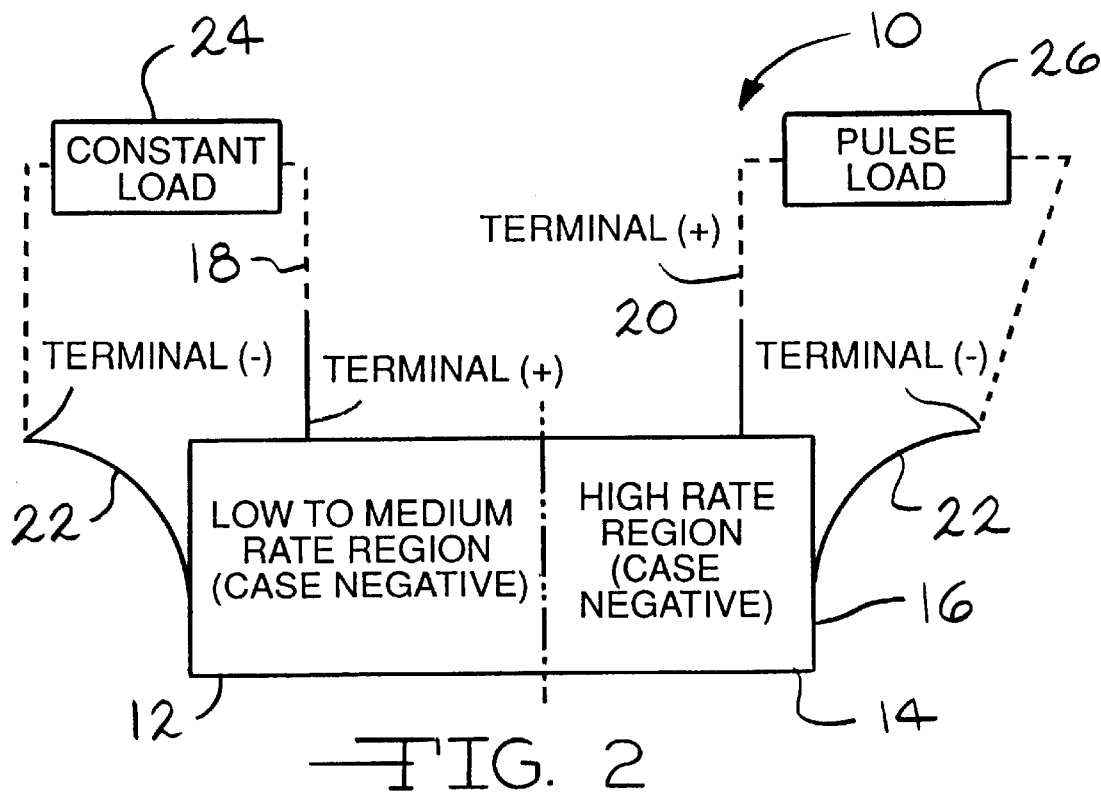
FIG. 2 is a schematic of the secondary electrochemical cell shown in FIG. 1.

Referring now to the drawings, FIGS. 1 and 2 show a secondary electrochemical cell 10 with multiplate and jellyroll electrodes constructed according to the present invention having both a medium rate region 12 and a high rate region 14 hermetically sealed within a metallic, prismatic casing 16. The medium rate region 12 preferably provides a relatively constant discharge current and the high rate region 14 preferably provides a high current pulse discharge power source. Both electrode regions are activated with the same electrolyte solution.

As diagrammatically shown in FIG. 2, the present secondary cell comprises two positive terminal leads 18, 20 and a common negative terminal lead 22. In other words, the medium rate region and the high rate region have separate and distinct positive terminals and the same negative terminal, i.e., the prismatic casing 16. Two different loads are applied to this battery. A constant resistance load 24 is connected to the positive terminal 18 and the negative terminal 20, i.e., the casing 16, and a constant current pulse "load" 26 is connected to the positive terminal 20 and the casing 16. The housing 16 is vacuum filled with a nonaqueous electrolyte common to both the medium rate region 12 and the high rate region 14. A device providing both a constant resistance load and a constant current pulse "load" is, for example, an implantable medical device such as a cardiac defibrillator.

More particularly, the carbonaceous active material for the anode electrode of the medium rate region and the high rate region of a secondary electrochemical cell with multiplate and jellyroll electrodes according to the present invention is any of the various forms of carbon (e.g., coke, graphite, acetylene black, carbon black, etc.) which are capable of reversibly retaining the lithium species. Graphite is preferred due to its relatively high lithium-retention capacity. Carbon fibers are particularly advantageous because they have excellent mechanical properties which permit them to be fabricated into rigid electrodes that are capable of withstanding degradation during repeated charge-discharge cycling. Moreover, their high surface area allows rapid charge/discharge rates. The carbon may be contacted to a conductive substrate such as by pressing, bonding and the like. A preferred carbonaceous material for the anode of the present secondary electrochemical cell is described in U.S. Pat. No. 5,443,928 to Takeuchi et al., which is assigned to the assignee of the present invention and incorporated herein by reference.

A typical anode electrode is fabricated by mixing about 90 to 99 weight percent graphite with 1 to 10 weight percent of a fluoro-resin binder. This mixture is rolled onto a current collector such as nickel, stainless steel, or copper foil or screen. The graphite electrode can be lithiated electrochemically using a lithium electrode, chemically or via the cathode. The $Li_xC_6$ electrode can have an x range between 0.1 and 1.0.

As shown in FIG. 1, the anode for the medium rate region 12 and the high rate region 14 is a sheet 28 of the carbonaceous mixture, pressed or rolled on a metallic anode current collector, i.e., preferably comprising copper. The anode has an extended tab or lead of a mettalic material, i.e., preferably nickel, integrally formed therewith, such as by welding. In this configuration, the lead is contacted by a weld to the conductive metal casing 16 serving as the negative terminal 20 in a case-negative configuration for both regions 12, 14. The casing 16 is preferably a prismatic housing that may comprise materials such as stainless steel, mild steel, nickel-plated mild steel, titanium or aluminum, but not limited thereto, so long as the metallic material is compatible for use with the other components of the cell.

The lithium-retention cathode material for both the medium rate and high rate regions may comprise a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

In the case of the cathode structure for the medium rate region 12, the cathode active material may be in a dry powder form pressed onto a conductive metal screen. Aluminum is a suitable material for the cathode current collector. Preferably, prior to contact with the conductive current collector, the cathode active material in a finely divided form is mixed with conductive diluents and a binder material and then pressed onto the current collector screen. The binder material is preferably a thermoplastic polymeric binder material. The term thermoplastic polymeric binder material is used in its broad sense and any polymeric material which is inert in the cell and which passes through a thermoplastic state, whether or not it finally sets or cures, is included within the term "thermoplastic polymer". Representative materials include polyethylene, polypropylene and fluoropolymers such as fluorinated ethylene and fluorinated propylene, polyvinylidene fluoride (PVDF) and polytetrafluoroethylene (PTFE), PVDF being most preferred. Natural rubbers are also useful as the binder material with the present invention.

Suitable discharge promoter diluents include graphite powder, acetylene black powder and carbon black powder. Metallic powders such as aluminum and stainless steel are also useful as conductive diluents. In practice, about 80% to about 98%, by weight, of the lithium-retention cathode active material is mixed with about 1% to about 5% of the conductive diluents and about 1% to about 5% of the binder material. In some cases, no binder material or electronic conductor material is required to provide a similarly suitable cathode body. The cathode structure for the medium rate region may also be prepared by rolling, spreading or pressing a mixture of the materials mentioned above onto a suitable current collector.

The cathode structure for the medium rate region 12, prepared as described above, is preferably in the form of one or more cathode plates 30 operatively associated with the previously described anode sheet 28 in a side-by-side relationship. The cathode plates 30 have a relatively low surface area and high density. For a carbon/LiCoO$_2$ cell, this electrode configuration provides low electrical current on the order of about 1 microampere to about 100 milliamperes corresponding to a C-Rate of about C/1,400,000 to about C/14. Preferably, at least one cathode plate 30 having a thickness of about 0.001 inches to about 0.020 inches is flanked on either side by oppositely positioned surfaces of the anode 28 prepared as described above.

The high rate region 14 of the present secondary cell comprises cathode plates 32 formed from a paste of lithium-retention cathode material, including binder and conductive additives, calendared into a free-standing structure that is subsequently dried and cut to shape. The shaped cathode structure having a thickness of about 0.0005 inches to about 0.010 inches is then pressed onto at least one side, and preferably both sides, of a current collector screen of a suitable material, such as aluminum, to provide the cathode structure in the form of plates 32. Preferably, the cathode plate 32 is associated with the anode sheet 28 in a jellyroll wound configuration. For a carbon/LiCoO$_2$ cell, this electrode configuration provides electrical current on the order of about 0.14 amps to about 14 amps corresponding to a C-Rate of about C/10 to about C/0.1 for the high rate region. A process for making cathode structures useful in the high rate region of the present multiplate electrode secondary cell is described in U.S. Pat. No. 5,435,874 to Takeuchi et al., which is assigned to the assignee of the present invention and incorporated herein by reference. An alternate preparation technique is to cast a slurry of the lithium-retention cathode material onto a surface-treated metal foil followed by drying and calendaring.

A preferred configuration for the present multiplate and jellyroll cell 10 is shown in FIG. 1 and comprises a cathode plate 30 of a relatively low surface area and high density inserted into the center of a winding mandrel (not shown) suitable for fabricating flattened jellyroll electrode cells. Possibly, the center cathode plate 30 may serve as a winding mandrel for the jellyroll electrode assembly itself. A jellyroll assembly consisting of the anode sheet 28 and high surface area cathode sheet 32 is then wrapped around the winding mandrel containing the inserted cathode plate 30. That way, the anode sheet 28 is exposed to both surfaces of the central cathode plate 30 and the cathode sheet 32 within the same jellyroll structure.

Preferably, additional cathode plates 30 are positioned on one or both of the outer portions of the jellyroll wind.

The lead 18 for the cathode plates 30 of the medium rate region 12 and the lead 20 for the cathode plates 32 of the high rate region 14 are insulated from the casing 16 by respective glass-to-metal seal/terminal lead feedthroughs. The glass used is of a corrosion resistant type having from between about 0% to about 50% by weight silicon such as CABAL 12, TA 23, CORNING 9013, FUSITE 425 or FUSITE 435. The positive terminal leads 18, 20 preferably comprise molybdenum although aluminum, nickel alloy, or stainless steel can also be used.

Either or both of the lithium-retention cathode plates 30, 32 and the carbonaceous anode sheet 28 for both the medium rate and high rate regions may be sealed in their own separator envelopes (not shown for clarity) to prevent direct physical contact between them. The separator is of an electrically insulative material to prevent an internal electrical short circuit between the active materials, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include woven and non-woven fabrics of polyolefinic fibers including polypropylene and polyethylene or fluoropolymeric fibers including polyvinylidene fluoride, polyethylenetetrafluoroethylene, and polyethylenechlorotrifluoroethylene laminated or superposed with a polyolefinic or fluoropolymeric microporous film, non-woven glass, glass fiber materials and, ceramic materials. Suitable microporous films include a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C.H. Dexter, Div., Dexter Corp.).

The multiplate and jellyroll secondary electrochemical cell of the present invention further includes a nonaqueous, ionically conductive electrolyte which serves as a medium for migration of ions between the anode and the cathode structures during the electrochemical reactions of the cell. The electrochemical reaction at both the medium rate and high rate regions involves conversion of ions in atomic or molecular forms which migrate from the anode to the cathode during discharging of the cell and from the cathode back to the anode during charging of the cell. Thus, nonaqueous electrolytes suitable :for the present invention exhibit those physical properties necessary for ionic transport namely, low viscosity, low surface tension and wettability.

Suitable nonaqueous electrolytes are comprised of an inorganic salt dissolved in a nonaqueous solvent and more preferably an alkali metal salt dissolved in a mixture of aprotic organic solvents comprising a low viscosity solvent including organic esters, ethers and dialkyl carbonates, and mixtures thereof, and a high permittivity solvent including cyclic carbonates, cyclic esters and cyclic amides, and mixtures thereof. Suitable nonaqueous low viscosity solvents include tetrahydrofuran (THF), methyl acetate (MA), diglyme, triglyme, tetraglyme, dimethyl carbonate (DMC), diethyl carbonate (DEC), dipropyl carbonate (DPC), methyl ethyl carbonate (MEC), methyl propyl carbonate (MPC), ethyl propyl carbonate (EPC), 1,2-dimethoxyethane (DME), and others. Preferred high permittivity solvents include propylene carbonate (PC), ethylene carbonate (EC), butylene carbonate (BC), acetonitrile, dimethyl sulfoxide, dimethyl formamide, dimethyl; acetamide, γ-butyrolactone (GBL) and N-methylpyrrolidinone (NMP) and others.

Known lithium salts that are useful as a vehicle for transport of alkali metal ions from the anode to the cathode and back again include $LiPF_6$, $LiBF_4$, $LiAsF_6$, $LiSbF_6$, $LiClO_4$, $LiAlCl_4$, $LiGaCl_4$, $Li_2O$, $LiNO_3$, $LiC(SO_2CF_3)_3$, $LiN(SO_2CF_3)_2$, LiSCN, $LiO_3SCF_2CF_3$, $LiC_6F_5SO_3$, $LiO_2CCF_3$, $LiSO_3F$, $LiB(C_6H_5)_4$ and $LiCF_3SO_3$, and mixtures thereof. Suitable salt concentrations typically range between about 0.8 to 1.5 molar, and a preferred electrolyte for a rechargeable lithium ion cell according to the present invention includes $LiAsF_6$ or $LiPF_6$ dissolved in an equilibrated mixture of ethyl methyl carbonate, dimethyl carbonate, diethyl carbonate and ethylene carbonate.

The rechargeable cell of the present invention is initially in a discharged state and lithium contained within the cathode is intercalated into the anode by applying an externally generated electrical potential to charge the cell. The applied electrical potential serves to draw the alkali metal ions from the cathode material, through the electrolyte and into the carbonaceous anode to saturate the carbonaceous material comprising the anode. The cell is then provided with an electrical potential and is discharged in a normal manner.

The casing header comprises a metallic lid (not shown) having a sufficient number of openings to accommodate the glass-to-metal seal/terminal lead feedthroughs for the cathode plates 30, 32 of the medium and high rate regions 12, 14. An additional opening is provided for electrolyte filling. The casing header comprises elements having compatibility with the other components of the secondary electrochemical cell and is resistant to corrosion. The present secondary cell is thereafter filled with the electrolyte solution described hereinabove and hermetically sealed such as by close-welding a stainless steel plug over the fill hole, but not limited thereto.

An exemplary secondary electrochemical cell dischargeable under both a constant discharge rate and a pulse discharge rate according to the present invention may be constructed having a capacity (Qa) of the anode and a capacity (Qc) of the high rate cathode region and of the medium rate cathode region each of a Qa:Qc ratio greater than 0.8:1.0. In this case, the Qa:Qc capacity ratio for both the medium rate and high rate regions may be as high as 1.5:1.0 or as low as 0.8:1.0.

1) A first exemplary condition consists of the high rate region and the medium rate region, each having a Qa:Qc ratio greater than 0.8:1.0. In this case, the Qa:Qc capacity ratio for both the medium rate and high rate regions may be as high as 1.5:1.0 or as low as 0.8:1.0.

The overall cell balance depends on the ratio of capacity for the high rate region to the medium rate region of the cell. Preferably, the high rate region is less than 50% of the total cell capacity while the medium rate region comprises greater than 50% of the total cell capacity. In the case of a 50:50 capacity ratio between the high rate and medium rate regions of the total cell capacity, the respective Qa:Qc ratios are shown in Table 1.

TABLE 1

| High Rate Region (Qa:Qc) | Medium Rate Region (Qa:Qc) | Total Cell Capacity (Qa:Qc) |
| --- | --- | --- |
| 1.1:1.0 | 1.0:1.0 | 1.05:1.0 |

It is appreciated that various modifications to the inventive concepts described herein may be apparent to those skilled in the art without departing from the spirit and scope of the present invention defined by the hereinafter appended claims.

What is claimed is:
1. An electrochemical cell, which comprises:
   a) an anode electrode of an anode material capable of intercalation and de-intercalation of lithium;
   b) a cathode electrode electrically associated with the anode electrode to provide at least a first region and a second region of the cell, wherein the first region and the second region comprise respective first and second lithium-retention materials;
   c) an electrolyte activating and operatively associating the anode electrode and the cathode electrode such that the first region and the second region are dischargeable independent of each other to provide separate and independent sources of electrical energy; and
   d) wherein a first capacity ratio and a second capacity ratio of the anode material to the respective first and second lithium-retention materials is at least 1.0:1.0, or greater.

2. The electrochemical cell of claim 1 wherein the first region of the cell comprises at least one cathode plate as a first cathode structure, the first cathode plate being in a face-to-face relationship with the anode electrode and the second region of the cell comprises a second cathode structure disposed in a jellyroll wound configuration with a portion of the anode electrode.

3. The electrochemical cell of claim 2 wherein the anode and the associated first cathode structure provide electrical energy at a first current and wherein the anode and the associated second cathode structure provide electrical energy at a second current greater than the first current.

4. The electrochemical cell of claim 2 wherein the anode associated with the first cathode structure is dischargeable under a substantially constant discharge rate and the anode associated with the second cathode structure is dischargeable under a current pulse discharge application.

5. The electrochemical cell of claim 2 including a conductive casing housing the cell and serving as a terminal for the anode electrode and wherein the first cathode structure is connected to a first terminal lead and the second cathode structure is connected to a second terminal lead.

6. The electrochemical cell of claim 1 wherein the anode electrode is electrically connected to a casing to provide a case-negative configuration for the cell.

7. The electrochemical cell of claim 6 wherein the first and second lithium-retention materials are electrically connected to respective cathode terminals electrically insulated from the casing.

8. The electrochemical cell of claim 1 wherein the first and second lithium-retention materials are the same.

9. The electrochemical cell of claim 1 wherein the first and second lithium-retention materials are dissimilar.

10. The electrochemical cell of claim 1 wherein the first and second lithium-retention materials are selected from the group consisting of $LiNiO_2$, $LiMn_2O_4$, $LiCoO_2$, $LiCo_{0.92}Sn_{0.08}O_2$, lithium cobalt nickel oxide, and mixtures thereof.

11. The electrochemical cell of claim 1 wherein both the first and second regions comprise from about 80 weight percent to about 98 weight percent of the lithium-retention materials.

12. The electrochemical cell of claim 1 wherein at least one of the first and second lithium-retention materials is mixed with at least one of a binder material and conductive additives.

13. The electrochemical cell of claim 12 wherein the binder material is a thermoplastic material.

14. The electrochemical cell of claim 12 wherein the conductive additives are selected from the group consisting of carbon black, graphite powder, acetylene black, aluminum powder, stainless steel powder, and mixtures thereof.

15. The electrochemical cell of claim 1 wherein the first and second regions comprise about 1 to 5 weight percent of a conductive additive, about 1 to 5 weight percent of a binder material and about 80 to 98 weight percent: of the respective first and second lithium-retention materials.

16. The electrochemical cell of claim 2 wherein the at least one cathode plate of the first cathode structure has a thickness in the range of from about 0.001 inches to about 0.020 inches and the second cathode structure has a thickness in a range of from about 0.0005 inches to about 0.010 inches.

17. The electrochemical cell of claim 2 wherein a first one of the cathode plates comprising the first region is disposed in a face-to-face prismatic position centered in the jellyroll wound configuration of the anode electrode and the second cathode structure of the cathode electrode and wherein a second one of the cathode plates comprising the first region is associated with the anode electrode in a face-to-face prismatic relationship spaced outwardly farther than the second cathode structure of the cathode electrode associated with the anode electrode in the jellyroll wound configuration.

18. The electrochemical cell of claim 2 wherein a casing houses the anode electrode and the at least one cathode plate of the first region dischargeable under a substantially constant discharge application, the first region comprising:
   i) the anode electrode comprising a carbonaceous material; and
   ii) the first lithium-retention material selected from the group consisting of $LiNiO_2$, $LiMn_2O_4$, $LiCoO_2$, $LiCo_{0.92}Sn_{0.08}O_2$, lithium cobalt nickel oxide, and mixtures thereof;
and wherein the casing further houses the anode electrode and the second structure of the second region dischargeable under a current pulse discharge application, the second region comprising:
   i) the anode; and
   ii) the second lithium-retention material selected from the group consisting of $LiNiO_2$, $LiMn_2O_4$, $LiCoO_2$, $LiCo_{0.92}Sn_{0.08}O_2$, lithium cobalt nickel oxide, and mixtures thereof.

19. The electrochemical cell of claim 2 wherein the first region contributes greater than 10% of the total energy density of the cell while the first structure provides less than 50% of the total surface area provided by the cathode electrode.

20. The electrochemical cell of claim 2 wherein the first region has greater than 10% of the total energy density of the cell while the first structure provides less than 30% of the total surface area provided by the cathode electrode.

21. The electrochemical cell of claim 1 wherein the first region of the cell is dischargeable at a relatively low electrical current of about 1 microampere to about 100 milliamperes corresponding to a C-rate of about C/1,400,000 to about C/14, and wherein the second region of the cell is dischargeable at a relatively high electrical current of about 0.14 amperes to about 14 amperes corresponding to a C-rate of about C/10 to about C/0.1.

22. The electrochemical cell of claim 1 wherein the first region and the second region each contribute about 50% of the total cell capacity.

23. The electrochemical cell of claim 1 wherein a capacity ratio of the anode electrode to the first lithium-retention material comprising the first region of the cell is from about 1.0:1.0 to about 1.5:1.0.

24. The electrochemical cell of claim 1 wherein a capacity ratio of the anode electrode to the second-lithium retention material comprising the second region of the cell is from about 1.0:1.0 to about 1.5:1.0.

25. The electrochemical cell of claim 1 wherein a capacity ratio of the first region to the second region is about 0.05 to about 0.5.

26. The electrochemical cell of claim 25 wherein a capacity ratio of the anode electrode to the first and second lithium-retention materials comprising the respective first and second regions of the cell is each from about 1.0:1.0 to about 1.5:1.0.

27. The electrochemical cell of claim 1 wherein the electrolyte includes a salt selected from the group consisting of $LiPF_6$, $LiBF_4$, $LiAsF_6$, $LiSbF_6$, $LiClO_4$, $LiAlCl_4$, $LiGaCl_4$, $Li_2O$, $LiNO_3$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof.

28. The electrochemical cell of claim 1 wherein the electrolyte includes at least one nonaqueous solvent selected from the group consisting of tetrahydrofuran, dimethyl carbonate, ethyl methyl carbonate, diethyl carbonate, propylene carbonate, methyl acetate, acetonitrile, dimethyl sulfoxide, dimethyl formamide, dimethyl acetamide, ethylene carbonate, diglyme, triglyme, tetraglyme, 1,2-dimethoxyethane, γ-butyrolactone, N-methyl-2-pyrrolidone, and mixtures thereof.

29. An electrochemical cell, which comprises:
   a) a casing;
   b) a carbonaceous anode;
   c) a first cathode of a first lithium-retention material;
   d) a second cathode of a second lithium-retention material, wherein the first cathode comprises at least one first cathode plate having first and second major surfaces extending to and meeting with spaced apart sides meeting spaced apart ends joined to the sides to provide the at least one first cathode plate having a thickness between the first and second major surfaces defined by widths of the spaced apart sides and widths of the spaced apart ends, wherein at least a portion of the anode is in a face-to-face relationship with the first and second major surfaces and with either the spaced apart sides or the spaced apart ends of the at least one first cathode plate comprising the first cathode and wherein the second cathode is disposed in a jellyroll configuration with a portion of the anode and wherein a first capacity ratio and a second capacity ratio of the carbonaceous anode material to the respective first and second lithium-retention materials is at least 1.0:1.0, or greater; and
   e) an electrolyte activating and operatively associating the anode, the first cathode, and the second cathode, and wherein the anode associated with the first cathode and the anode associated with the second cathode are dischargeable independent of each other to provide separate and independent sources of electrical energy.

30. The electrochemical cell of claim 29 wherein the anode and the associated first cathode provide electrical energy at a first current and wherein the anode and the associated second cathode disposed in the jellyroll configuration provide electrical energy at a second current greater than the first current.

31. The electrochemical cell of claim 29 wherein the anode associated with the first cathode is dischargeable under a substantially constant discharge rate and the anode associated with the second cathode in the jellyroll configuration is dischargeable under a current pulse discharge application.

32. The electrochemical cell of claim 29 wherein the anode is electrically connected to the casing to provide a case-negative configuration for the cell.

33. The electrochemical cell of claim 29 wherein both the first and second cathodes are electrically connected to respective cathode terminals electrically insulated from the casing.

34. The electrochemical cell of claim 29 wherein the first and second lithium-retention materials are the same.

35. The electrochemical cell oaf claim 29 wherein the first and second lithium-retention materials are dissimilar.

36. The electrochemical cell of claim 29 wherein the first and second lithium-retention materials of the first and second cathodes are selected from the group consisting of $LiNiO_2$, $LiMn_2O_4$, $LiCoO_2$, $LiCo_{0.92}Sn_{0.08}O_2$, lithium cobalt nickel oxide, and mixtures thereof.

37. An electrochemical cell, comprising:
a) a casing of electrically conductive material;
b) a first electrochemical couple housed within the casing and dischargeable under a substantially constant discharge application, the first couple comprising;
   i) an anode comprising a carbonaceous material; and
   ii) a first cathode of a first lithium-retention material selected from the group consisting $LiNiO_2$, $LiMn_2O_4$, $LiCoO_2$, $LiCo_{0.92}Sn_{0.08}O_2$, lithium cobalt nickel oxide, and mixtures thereof, wherein the anode and the first cathode are associated with each other in a side-by-side relationship;
c) a second electrochemical couple housed within the casing and dischargeable under a current pulse discharge application, the second couple comprising:
   i) the anode; and
   ii) a second cathode of a second lithium-retention material selected from the group consisting of a $LiNiO_2$, $LiMn_2O_4$, $LiCoO_2$, $LiCo_{0.92}Sn_{0.08}O_2$, lithium cobalt nickel oxide, and mixtures thereof, wherein the anode and the second cathode are associated with each other in a jellyroll relationship and wherein a first capacity ratio and a second capacity ratio of the carbonaceous anode material to the respective first and second lithium-retention materials is at least 1.0:1.0, or greater; and
d) an electrolyte solution operatively associated with the first electrochemical couple and the second electrochemical couple, wherein the first couple is dischargeable independent of the second couple to provide separate and independent sources of electrical energy.

38. The electrochemical cell of claim 37 wherein the first electrochemical couple comprises portions of the anode disposed adjacent to opposite sides of the first cathode and wherein the second electrochemical couple comprises portions of the anode disposed adjacent to opposed sides of the second cathode.

39. A secondary electrochemical cell comprising a carbonaceous, anode and a first cathode in a side-by-side relationship capable of delivering electrical current in a first range of currents, the cell further comprising the anode and a second cathode in a jellyroll relationship capable of independently and simultaneously delivering electrical current in a second range of currents greater than the first range of currents, wherein a first capacity ratio and a second capacity ratio of the anode to the respective first and second cathodes is at least 1.0:1.0, or greater.

40. The electrochemical cell of claim 39 wherein the anode is of a carbonaceous material and the first cathode is of a lithium-retention material and wherein the first range of currents is about 1 microamperes to about 100 milliamperes corresponding to a C-Rate of about C/1,400,000 to about C/14, and wherein the second cathode is of a lithium-retention material and the second range of currents is about 0.14 amperes to about 14 amperes corresponding to a C-Rate of about C/10 to about C/0.1.

41. In combination with an implantable medical device requiring electrical power for both a monitoring function and a device operating function, a secondary electrochemical cell having a carbonaceous anode and a first lithium-retention cathode capable of providing an electrical current of about 1 microampere to about 100 milliamperes corresponding to a C-Rate of about C/1,400,000 to about C/14 for the monitoring function, and wherein the anode and a second lithium-retention cathode disposed in a jellyroll configuration are independently and simultaneously capable of delivering electrical pulse currents of about 0.14 amperes to about 14 amperes corresponding to a C-Rate of about C/10 to about C/0.1 for the device operating function, and wherein a first capacity ratio of the anode and the first lithium-retention material and a second capacity ratio of the anode and the second lithium-retention material are each at least 1.0:1.0, or greater.

42. A method for providing a secondary electrochemical cell, comprising the steps of:
a) providing a casing of electrically conductive material;
b) housing a first electrochemical cell within the casing, comprising the steps of:
   i) providing an anode comprising a carbonaceous material electrically connected to an anode current collector; and
   ii) providing a first cathode of a first lithium-retention material electrically connected to a first cathode current collector, wherein the first cathode is electrically associated with a first portion of the anode and comprises at least one first cathode plate having first and second major surfaces extending to and meeting with spaced apart sides meeting spaced apart ends joined to the sides to provide the at least one first cathode plate having a thickness between the first and second major surfaces defined by widths of the spaced apart sides and widths of the spaced apart ends, and wherein at least a portion of the anode is in a face-to-face relationship with the first and second major surfaces and either the spaced apart sides or the spaced apart ends of the at least one first cathode plate comprising the first cathode;
c) housing a second electrochemical cell within the casing, comprising the steps of:
   i) providing a second cathode of a second lithium-retention material electrically connected to a second cathode current collector; and
   ii) electrically associating the second cathode with a second portion of the anode not already associated with the first cathode, and wherein a first capacity ratio and a second capacity ratio of the carbonaceous anode material to the respective first and second lithium-retention materials is at least 1.0:1.0, or greater; and
d) activating the first and second electrochemical cells with an electrolyte solution operatively associated therewith.

43. The method of claim 42 including discharging the first electrochemical couple under a substantially constant discharge rate and discharging the second electrochemical couple under a current pulse discharge application.

44. The method of claim 42 including electrically connecting the anode current collector to the casing and further electrically connecting both the first and second cathode current collectors to respective cathode terminals electrically insulated from the casing.

45. The method of claim 42 including selecting the first and second lithium-retention materials from the group consisting of $LiNiO_2$, $LiMn_2O_4$, $LiCoO_2$, $LiCo_{0.92}Sn_{0.08}O_2$, lithium cobalt nickel oxide, and mixtures thereof.

46. The method of claim 42 including providing a casing housing the anode and the first cathode as a first electrochemical couple dischargeable under a substantially con stant discharge application, and further providing the first couple comprising:

i) the anode comprising the carbonaceous material; and ii) the first lithium-retention material selected from the group consisting of $LiNiO_2$, $LiMn_2O_4$, $LiCoO_2$, $LiCo_{0.92}Sn_{0.08}O_2$, lithium cobalt nickel oxide, and mixtures thereof;

and providing the anode and the second cathode as a second electrochemical couple housed within the casing and dischargeable under a current pulse discharge application, and further providing the second couple comprising:

i) the anode; and ii) the second lithium-retention material selected from the group consisting of $LiNiO_2$, $LiMn_2O_4$, $LiCoO_2$, $LiCo_{0.92}Sn_{0.08}O_2$, $LiCo_{1-x}Ni_xO_2$ (x=0.5 to 0.9), and mixtures thereof.

* * * * *